United States Patent
Singhal et al.

(10) Patent No.: US 11,044,593 B2
(45) Date of Patent: Jun. 22, 2021

(54) METHOD AND DEVICES FOR MANAGING CONSTRAINED DEVICES

(71) Applicant: Telefonaktiebolaget LM Ericsson (publ), Stockholm (SE)

(72) Inventors: Sumit Singhal, Karlskrona (SE); Jan Höller, Lidingö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 92 days.

(21) Appl. No.: 15/780,539

(22) PCT Filed: Dec. 3, 2015

(86) PCT No.: PCT/SE2015/051306
§ 371 (c)(1),
(2) Date: May 31, 2018

(87) PCT Pub. No.: WO2017/095283
PCT Pub. Date: Jun. 8, 2017

(65) Prior Publication Data
US 2018/0359621 A1 Dec. 13, 2018

(51) Int. Cl.
*H04L 12/26* (2006.01)
*H04W 4/70* (2018.01)
(Continued)

(52) U.S. Cl.
CPC ............ *H04W 4/70* (2018.02); *H04L 67/12* (2013.01); *H04L 67/16* (2013.01); *H04W 8/005* (2013.01);
(Continued)

(58) Field of Classification Search
None
See application file for complete search history.

(56) References Cited

U.S. PATENT DOCUMENTS

| 2005/0144343 | A1 | 6/2005 | Hamdan | |
|---|---|---|---|---|
| 2016/0050701 | A1* | 2/2016 | Pyattaev | H04W 72/0406 370/329 |
| 2016/0100362 | A1* | 4/2016 | Palanisamy | H04W 72/042 370/311 |

FOREIGN PATENT DOCUMENTS

| CN | 103297322 A | 9/2013 | |
|---|---|---|---|
| CN | 104303454 A | 1/2015 | |
| WO | WO-2016196947 A1 * | 12/2016 | H04L 67/16 |

OTHER PUBLICATIONS

International Search Report and Written Opinion dated Aug. 19, 2016 issued in International Patent Application No. PCT/SE2015/051306. (9 pages).

(Continued)

*Primary Examiner* — Zewdu A Beyen
(74) *Attorney, Agent, or Firm* — Rothwell, Figg, Ernst & Manbeck, P.C.

(57) ABSTRACT

A method (30) performed in a client device (16) is provided for managing constrained devices (14a, 14b, 14c), which to at least some extent fail to support a Lightweight Machine to Machine, LWM2M, protocol. The client device (16) is compatible with a LWM2Mprotocol for communicating with a LWM2M server (17) and comprises a LWM2Mcontroller object (22) for management of any discovered constrained device (14a, 14b, 14c). The method (30) comprises discovering (31) one or more constrained devices (14a, 14b, 14c); creating (32), for each discovered constrained device (14a, 4b, 14c), a respective LWM2M connected device object (23), wherein the LWM2M controller object (22) points at the one or more created LWM2Mconnected device 10 objects (23); and exposing (33) the LWM2M controller object (22) to the LWM2M server (17). A method (40) in a server device (17), client (Continued)

device (16), server device (17), computer programs and computer program products are also provided.

22 Claims, 7 Drawing Sheets

(51) Int. Cl.
*H04L 29/08* (2006.01)
*H04W 8/00* (2009.01)
*H04W 80/06* (2009.01)
*H04W 80/12* (2009.01)
*H04W 92/10* (2009.01)

(52) U.S. Cl.
CPC ............ *H04W 80/06* (2013.01); *H04W 80/12* (2013.01); *H04W 92/10* (2013.01)

(56) References Cited

OTHER PUBLICATIONS

Na Zong, et al., "Research on Agent of Protocol Conversion of HTTP and CoAP", Computer Engineering & Software, HTTP CoAP, vol. 6, No. 10, 2015 (6 pages).

\* cited by examiner

US 11,044,593 B2

METHOD AND DEVICES FOR MANAGING CONSTRAINED DEVICES

CROSS REFERENCE TO RELATED APPLICATION(S)

This application is a 35 U.S.C. § 371 National Stage of International Patent Application No. PCT/SE2015/051306, filed Dec. 3, 2015, designating the United States, which is incorporated by reference.

TECHNICAL FIELD

The technology disclosed herein relates generally to the field of data communication, and in particular to method for a client device of managing constrained devices, client device, method for a server device of managing constrained devices, server device, and related computer programs and computer program products.

BACKGROUND

Machine to machine (M2M) is a concept encompassing devices, such as for instance sensors and so-called smart devices, using a network for communicating with remote applications of e.g. a server of Internet. Such communication may for instance be for the purpose of monitoring and control. Internet of Things (IoT) refers to a network of objects ("things") with network connectivity, and M2M may be considered an integral part of IoT. Together M2M/IoT covers a huge set of devices that communicate with each other directly and across networks based on various communication or access media, using short range technologies (e.g. Bluetooth or WiFi) as well as long range technologies (e.g. radio access such as 3G or 4G).

LightweightM2M (LWM2M) is a new standard from the Open Mobile Alliance (OMA) that is focused on constrained cellular devices and other M2M devices. The standard defines an efficient device-server interface based on open Internet Engineering Task Force (IETF) standards, i.e. Constrained Application Protocol (CoAP) and Datagram Transport Layer Security (DTLS). The LWM2M enabler includes device management and service enablement for LWM2M devices. This LWM2M enabler makes use of a light and compact protocol as well as an efficient resource data model to fit on constrained devices. Constrained devices here mean devices with limited processing power and memory, and many times also targeting very low power consumption.

A limitation with the usage of the existing LWM2M enabler framework of the LWM2M client and server is that an M2M Area Network, i.e. a localized deployment of IoT devices e.g. in a user's premises or an office building, may comprise devices that are very constrained in power consumption, processing capacity and memory. For the very constrained devices it would be impractical or even impossible to support a complete LWM2M client stack. Therefore the LWM2M framework cannot support these devices as there is no means to communicate with the LWM2M server.

Further, it is not a viable solution to expose e.g. home devices having such limited processing and storage capabilities to communicate with M2M network/server side on long range technologies such as cellular interfaces (e.g. Long Term Evolution, LTE). This would be an expensive way of communication both from technology aspects, e.g. power consumption, as well as from business aspects such as costs of cellular modem and mobile network operator tariffs.

SUMMARY

An objective of the present disclosure is to address and solve or at least alleviate the above mentioned problem.

The objective is according to an aspect achieved by a method performed in a client device for managing constrained devices, which to at least some extent fail to support a Lightweight Machine to Machine, LWM2M, protocol. The client device is compatible with a LWM2M protocol for communicating with a LWM2M server and comprises a LWM2M controller object for management of any discovered constrained device. The method comprises discovering one or more constrained devices; creating, for each discovered constrained device, a respective LWM2M connected device object, wherein the LWM2M controller object points at the one or more created LWM2M connected device objects; and exposing the LWM2M controller object to the LWM2M server.

The method provides several advantages. For instance, the method provides a mechanism for enabling a variety of devices to interact and communicate with a M2M network side or LWM2M server. The method enables a less complex network architecture to be used by having a single client device communicating on behalf of constrained devices. From a LWM2M server perspective, it is less complex as it need to communicate with a single LWM2M client, which is responsible for handling operations in e.g. a home network rather than communicating with each and every device supporting their own LWM2M client stacks and communicating with the LWM2M server separately. Further still, existing functionality of constrained or very constrained Internet Protocol (IP) devices can be intact and LWM2M client can handle network communication with LWM2M server for operations that needs to be executed on these constrained IP devices.

The objective is according to an aspect achieved by a computer program for a client device for managing constrained devices. The computer program comprises computer program code, which, when executed on at least one processor on the client device causes the client device to perform the method as above.

The objective is according to an aspect achieved by a computer program product comprising a computer program as above and a computer readable means on which the computer program is stored.

The objective is according to an aspect achieved by a client device for managing constrained devices, which to at least some extent fail to support a Lightweight Machine to Machine, LWM2M, protocol. The client device is compatible with a LWM2M protocol for communicating with a LWM2M server and comprises a LWM2M controller object for management of any discovered constrained device. The client device is configured to: discover one or more constrained devices; create, for each discovered constrained device, a respective LWM2M connected device object, wherein the LWM2M controller object points at the one or more created LWM2M connected device objects; and expose the LWM2M controller object to the LWM2M server.

An enhanced LWM2M client is provided that can support proxy functionality for a variety of IoT devices without the prerequisite of these IoT devices having an installed LWM2M stack and all the supported device capabilities.

The objective is according to an aspect achieved by a method performed in a server device for managing constrained devices, which to at least some extent fail to support a Lightweight Machine to Machine, LWM2M, protocol. The server device is compatible with a LWM2M protocol for communicating with a client device. The method comprises enabling a discovery mode on the LWM2M client; and receiving, from the LWM2M client device, a message comprising an updated counter resource indicating any changes to the number of connected constrained devices and an updated reference resource maintaining a list of references to created LWM2M connected device objects for all connected constrained devices.

The method provides several advantages. For instance, the LWM2M server is enabled to communicate with a single LWM2M client with new and enhanced LWM2M objects support that allows the LWM2M server to communicate and manage devices behind the LWM2M client device.

The objective is according to an aspect achieved by a computer program for a server device for managing constrained devices. The computer program comprises computer program code, which, when executed on at least one processor on the server device causes the server device to perform the method as above.

The objective is according to an aspect achieved by a computer program product comprising a computer program above and a computer readable means on which the computer program is stored.

The objective is according to an aspect achieved by a server device for managing constrained devices, which to at least some extent fail to support a Lightweight Machine to Machine, LWM2M, protocol. The server device is compatible with a LWM2M protocol for communicating with a client device. The server device is configured to: enable a discovery mode on the LWM2M client; and receive, from the LWM2M client device, a message comprising an updated counter resource indicating any changes to the number of connected constrained devices and an updated reference resource maintaining a list of references to created LWM2M connected device objects for all connected constrained devices.

Further features and advantages of the embodiments of the present teachings will become clear upon reading the following description and the accompanying drawings.

DETAILED DESCRIPTION

Figure 1:
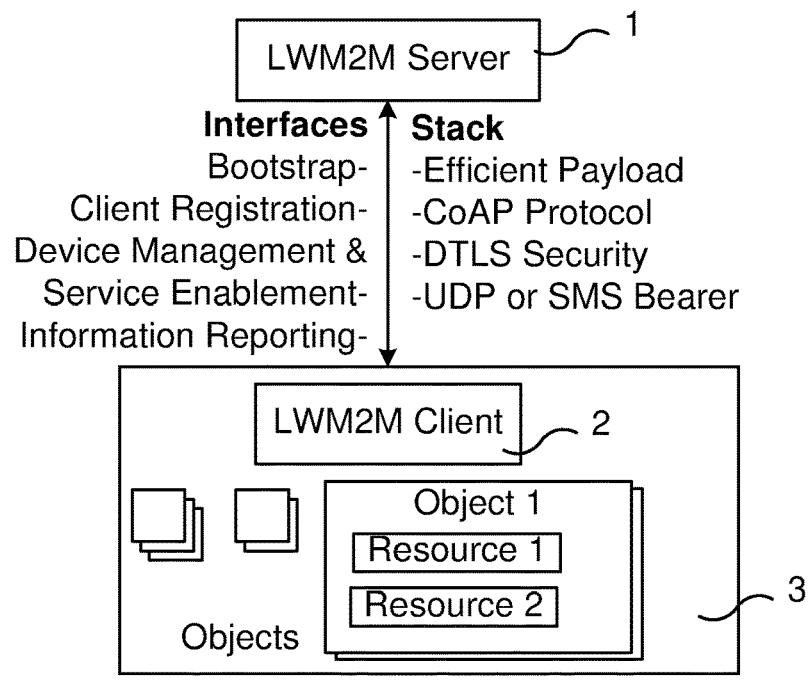
FIG. 1 illustrates a LWM2M architecture.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The present teachings address, in particular, a variety of devices like fridges, lights, various metering devices etc. that can at least support IP based communication in short range communication. From a home network perspective this would mean that these devices can support some short range technologies like Wi-Fi. The market for many legacy IoT devices has been relying on non-standard or de-facto standards for the communications and application stack. However, the market has rapidly converged on the use of the IP stack, and a large part of the market is also embracing web technologies like the RESTful paradigm. The implication is that new IoT devices, and even the very constrained devices, will be based on the IP stack.

Even if IP has become the choice of technology, some devices are so constrained in at least one of processing power and storage that even for IP stack support, application layer protocols like CoAP are hard to support; LWM2M plus the required CoAP support requires about the same amount of device memory as the entire IP stack on a typical processor. However, there is a need to bring those devices on the internet as well, but that would impact the cost of ownership of such devices for the consumers.

To meet the above identified needs the present teachings provide, in various embodiments, methods and devices for enabling IoT devices, and in particular very constrained devices, to communicate with Internet servers. The present teachings provide a mechanism to support a set of devices lacking a complete LWM2M stack through a single LWM2M client/server interface.

The LWM2M server may, for efficiency reasons, also benefit from having only a single or only a small number of IoT devices running separate LWM2M instances. Therefore, in some embodiments a logical grouping of devices related to residential, commercial, connected car devices etc. is made, having a common, single LWM2M client end point communicating with the LWM2M server. Instead of requiring each device e.g. in a home premises to support a unique LWM2M client, which would require the devices to have hardware and software to support this functionality, the use of a common LWM2M client is suggested herein. As mentioned in the background section, some of the constrained devices would not be able to handle the supporting of a unique LWM2M client as they are limited in at least one of processing capability and storage capability.

Further, by providing a single end point or LWM2M client for a connected home, e.g. in a Wi-Fi router, it can support a number of devices that are able to communicate over Wi-Fi/Wireless Local Area Network (WLAN) with the Wi-Fi router and the router can act as a LWM2M client. This physical and logical grouping is beneficial from a network topology perspective as well as from a functionality perspective.

The LWM2M enabler has evolved as a standard specification that captures a set of interfaces and an efficient payload based on simple flat client-server architecture, as illustrated in FIG. 1. For sake of completeness and in order to provide a thorough understanding of the present teachings, this known architecture is briefly described in the following with reference to FIG. 1.

FIG. 1 illustrates an existing LWM2M architecture comprising a LWM2M server 1 and LWM2M client 2 running on a LWM2M client device 3, e.g. a M2M device 3. Interfaces between the LWM2M server 1 and the LWM2M client 2 comprise: bootstrapping, which could be pre-provisioned or client/server initiated; client registration, wherein the client and its objects are registered; device management and service enablement, providing server access to objects or resources; and information reporting, enabling notifications with new resource values.

The LWM2M client 2 comprises a number of object instances. An object is a collection of resources and a resource is a piece of information that can be read, written or executed. Each resource may have multiple instances (e.g. height H, weight W, length L). Objects and resources are identified by a 16-bit integer while instances are identified by an 8-bit integer. Objects and resources may be accessed with simple Uniform Resource Identifiers (URIs).

Briefly, the present teachings target devices, mainly very small and constrained IoT devices, and in particular enabling communication for such devices, without them being required to comprise and run a full-fledged LWM2M client. Preferably, the devices comprise devices hosting an IP stack as it is believed that IP has become the market choice.

The present teachings extends the capabilities of an LWM2M client on an IoT device so that the LWM2M client exposes the capabilities of other devices, in particular very constrained devices, in a way that is compliant with LWM2M without each of those very constrained devices running a respective LWM2M client. In practical terms, the LWM2M client of the present teachings may be hosted on a node acting as an IoT gateway. It is however noted that the functionality of the node is not restricted to act as an IoT gateway only, and that it can host application functionality as well as other gateway capabilities.

Figure 2:
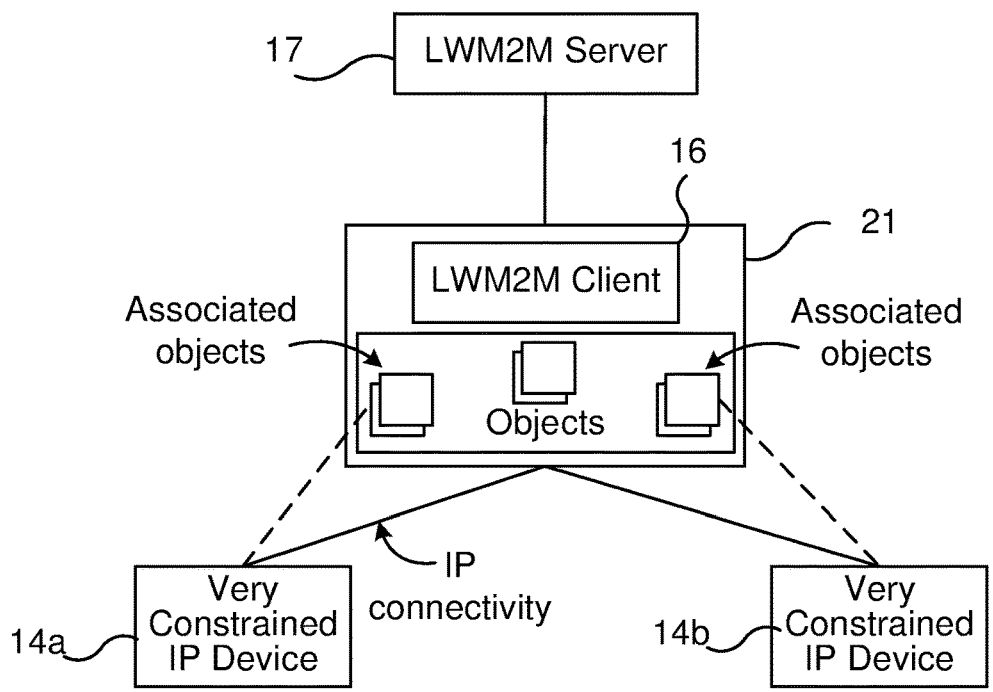
FIG. 2 illustrates an architecture according to the present teachings.

FIG. 2 illustrates an architecture according to the present teachings. The above is implemented by introducing new LWM2M objects and methods for an LWM2M server device 17 (in the following also denoted simply server 17) for communication with a LWM2M client device 21 comprising a LWM2M client 16, involving e.g. the interfaces described with reference to FIG. 1. The LWM2M client 16 may be implemented in hardware and/or software. The LWM2M client 16 communicates with the LWM2M server 17 on behalf of very constrained IoT devices 14a, 14b. The LWM2M client 16 runs a LWM2M client stack and may access a service available on the LWM2M server 17. The LWM2M client 16 supports a number of constrained and/or very constrained devices 14a, 14b, and a mechanism according to the present teachings allows support for discovery of new such devices as they attach and detach with the LWM2M client 16. Also, once attached, the LWM2M server 17 may control or manage the new devices and their functionalities via new objects ("associated objects") which represent the capabilities of the very constrained IP devices 14a, 14b that do not have the capability to support an LWM2M client.

Figure 3:
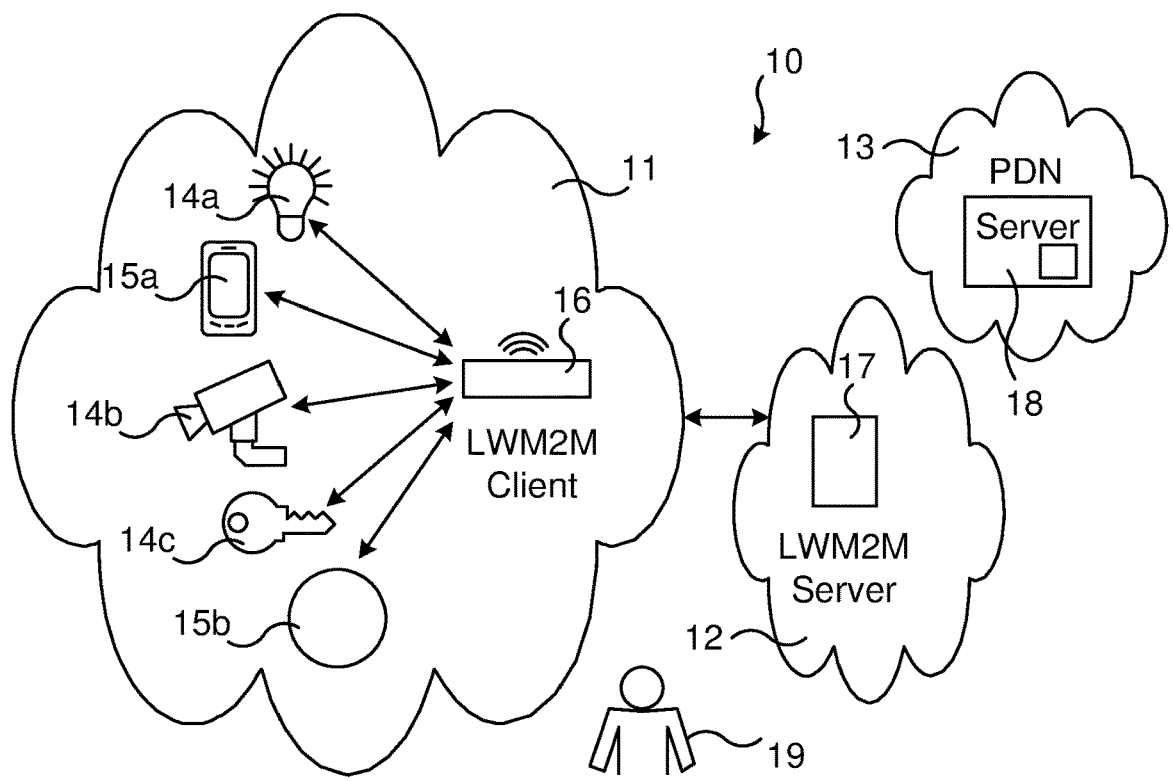
FIG. 3 illustrates schematically an environment in which embodiments according to the present teachings may be implemented.

FIG. 3 illustrates schematically an exemplary environment in which embodiments according to the present teachings may be implemented. A system 10 according to an aspect of the present teachings comprises a number of very constrained devices 14a, 14b, 14c and optionally also other devices 15a, 15b, for instance located within the home premises 11 of a user. As mentioned earlier, these devices, and in particular the very constrained devices 14a, 14b, 14c typically lack the processing capacity, power source and/or memory to run a LWM2M client protocol stack. Examples of such devices comprise light bulb 14a, security camera 14b and key 14c, to mention a few. The system 10 may comprise any number of such very constrained devices 14a, 14b, 14c or a mix of constrained and very constrained devices. As have been noted earlier, very constrained devices may not be able to support CoAP and LWM2M layers.

The system 10 may also comprise other devices such as home appliances 15a (e.g. fridge, washing machine etc.) and smart utility meters 15b. Such other devices 15a, 15b may have the capacity to host and run a LWM2M client.

The system 10 comprises a LWM2M client 16 which may, for instance, be run on a router or a residential gateway acting as both an IP gateway, and also as an endpoint for LWM2M support on behalf of the very constrained devices 14a, 14b, 14c. The smart utility meter 15b and the home appliance 15a may support a LWM2M client stack that connects to this residential gateway which relays communication on the IP level. In contrast, the very constrained devices 14a, 14b, 14c are not capable of running a full LWM2M client and instead connect to the LWM2M client 16 that acts on behalf of the very constrained devices to connect them to the LWM2M server 17. The very constrained devices 14a, 14b, 14c may communicate with the LWM2M client 16 over User Datagram Protocol/Internet Protocol (UDP/IP) based communication media support at the LWM2M client 16 side, i.e. they do not run the LWM2M client protocol stack themselves.

The LWM2M server 17, which may be implemented in hardware and/or software, may be provided in an operator network 12 or in a packet data network 13 such as Internet. The LWM2M server 17 may comprise M2M applications accessible by the very constrained devices 14a, 14b, 14c through the LWM2M client 16.

An end user 19 may use an interface exposed by the LWM2M server 17 to view and/or control the behavior of a home network comprising the very constrained devices 14a, 14b, 14c. As a particular example, an end user 19 may use her smart phone to access an application provided by the LWM2M server 17. The application may provide a "home control"-function, enabling the end user 19 to, for instance, control the very constrained devices 14a, 14b, 14c, such as switching lights on or off, or obtaining status reports from them, e.g. current indoor temperature or receiving pictures from a security camera 14b.

It is noted that the present teachings are not limited to this exemplary home premises 11 environment. Another exemplary environment in which the present teachings may be implemented is e.g. within logistics, shipping and loading of goods (not illustrated). For instance, a possible scenario comprises a container for shipping valuable goods, e.g. paintings. The very constrained devices 14a, 14b, 14c may in such scenario comprise a smart card, chip card, chip computer or the like for reporting e.g. location, temperature, identification, etc. A LWM2M client 16 according to the present teachings may be hosted e.g. on a gateway or Wi-Fi router arranged within the container, by means of which the very constrained devices 14a, 14b, 14c may then communicate.

Figure 4:
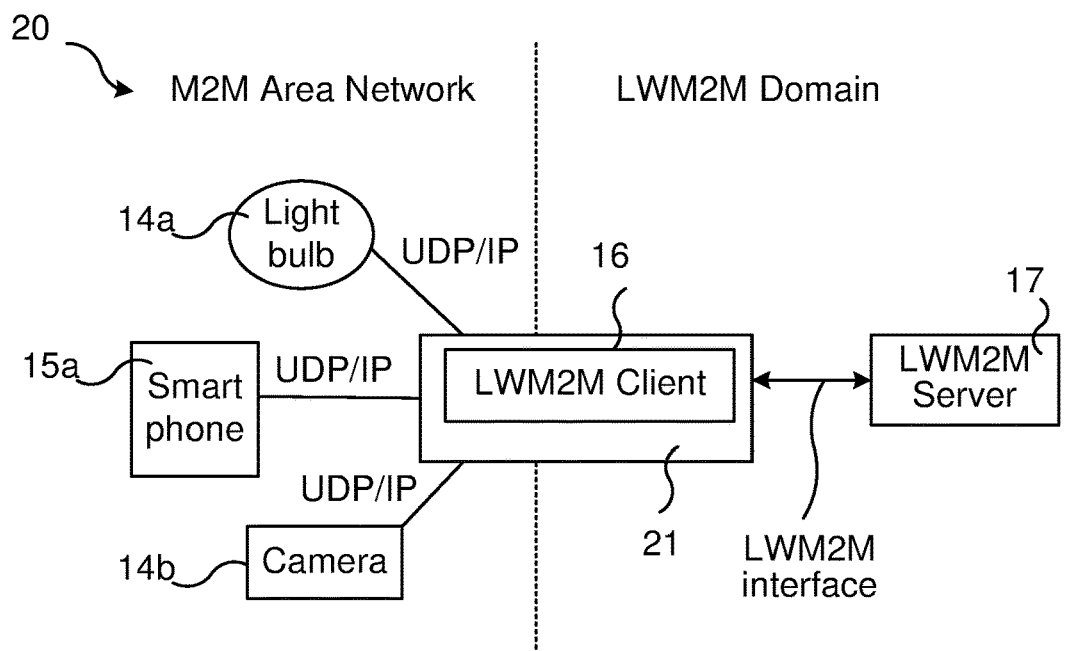
FIG. 4 illustrates a LWM2M client stack on a Wi-Fi router.

FIG. 4 illustrates an exemplary embodiment. A M2M area network 20 may e.g. comprise home premises, shipping container or industrial environment. The M2M area network 20 comprises a number of constrained and very constrained devices 14a, 14b, for instance comprising a light bulb 14a, a camera 14b and also a smart phone 15a. The LWM2M client 16 may be installed, for instance, on a Wi-Fi router 21.

14b, 15a that are behind the LWM2M client 16 in the M2M area network.

The objects may be represented according to the following, supporting the resources that have been mentioned:

LWM2M Object: ConnectedDeviceController

The ConnectedDeviceController object enables an LWM2M client 16 to keep track of connected devices 14a, 14b, 14c that are attached to the LWM2M client 16. The LWM2M client 16 has a respective ConnectedDeviceController object for each such device 14a, 14b, 14c.

TABLE 1

| Object definition | | | | |
|---|---|---|---|---|
| Object name | Object ID | Number of instances | Mandatory/ Optional | Object URN |
| ConnectedDeviceController | 10 | Single | Optional | TBD |

| Resource definitions | | | | | | |
|---|---|---|---|---|---|---|
| ID | Name | Operations | Instances | Mandatory/ optional | Type | Description |
| 0 | EnableDiscovery | RW | Single | Mandatory | Boolean | Descr. 1 |
| 1 | ConnectedDeviceCounter | R | Single | Mandatory | Integer | Descr. 2 |
| 2 | ConnectedDeviceRef | R | Multiple | Optional | String | Descr. 3 |

(URN = Uniform Resource Name,
TBD = to be decided)
(RW = read/write,
R = read)

As and when Wi-Fi enabled devices 14a, 14b, 15a are attached to the Wi-Fi router 21, the Wi-Fi router 21 updates a very constrained device table that it keeps. The LWM2M client 16 on the Wi-Fi router 21 can then use this information to populate context, that comprises a ConnectedDeviceController object and the ConnectedDevice object (described later) of the newly attached device. The LWM2M client 16 may inform about this newly attached device to the LWM2M server 17. This communication with the LWM2M server 17 utilizes the herein provided mechanism over the LWM2M interface. The present teachings may be applied for all devices in e.g. a home premises, and even non-constrained devices such as e.g. a smart phone 15a may be managed according to the present teachings.

It is noted that there is no LWM2M client 16 installed on the light bulb 14a, smartphone 15a and camera 14b and they utilize the existing communication mechanism with the Wi-Fi router 21 (or other device hosting the LWM2M client 16). Further, there is only a single LWM2M client 16 that communicates with the LWM2M server 17.

The present teachings introduce the following LWM2M objects:

1. ConnectedDeviceController object
2. ConnectedDevice object

According to the present teachings these objects are exposed externally to the LWM2M server(s) 17 via the LWM2M client 16, which means that the LWM2M server 17 will be explicitly aware of the very constrained non-LWM2M devices behind the LWM2M client 16 as separate devices based on their naming and addressing as will be described later.

The introduction of these objects enables a method in the LWM2M client 16 to discover and manage the devices 14a, In table 1, rightmost column ("Description"):

Descr. 1 ("EnableDiscovery"): By default this resource is set to false, i.e. the feature is disabled by default. If the resource is set to true by the LWM2M server 17, then the LWM2M client 16 is set to a discovery mode. The LWM2M client 16 then tries to discover the M2M area network 20 or connected devices 14a, 14b, 14c based on the supported access technology and respective support for discovery of devices.

Descr. 2 ("ConnectedDeviceCounter"): Default value is 0. This resource is a counter of the number of connected devices that are reachable through the LWM2M client 16 at any point of time.

Descr. 3 ("ConnectedDeviceRef"): This resource maintains a list of references to the ConnectedDevice object.

It is noted that there can be other relevant resources introduced as part of the ConnectedDeviceController object.

The ConnectedDevice object may be mapped to one or more Internet Protocol Smart Objects (IPSO) like Generic Sensor, Luminosity Sensor, Temperature Sensor etc. or a vendor specific extension capturing the functionality and capability of the particular connected device.

Figure 5:
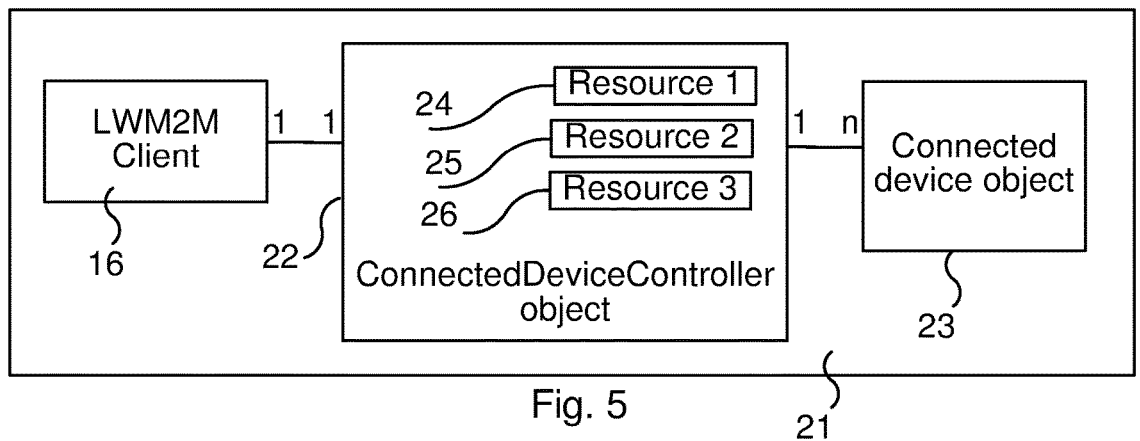
FIG. 5 is a diagram showing object relationship.

FIG. 5 is a diagram showing object relationship. The LWM2M client device 21 comprises a LWM2M client 16 and may comprise the above described ConnectedDeviceController object 22 for controlling a number of connected devices 14a, 14b, 14c; 15a, 15b. The ConnectedDeviceController object 22 can discover, manage and keep track of any number n of devices connected to the LWM2M client 16. The LWM2M client 16 creates and points at a ConnectedDevice object 23 for each connected very constrained device 14a, 14b, 14c. The ConnectedDeviceController object 22 comprises resources (indicated as Resource 1, Resource 2, Resource 3 in the figure) relating to management of the very constrained device 14a, 14b, 14c, for instance Connected- DeviceCounter resource 24, a ConnectedDeviceRef resource 25, and an EnableDiscovery resource 26.

Figure 6:
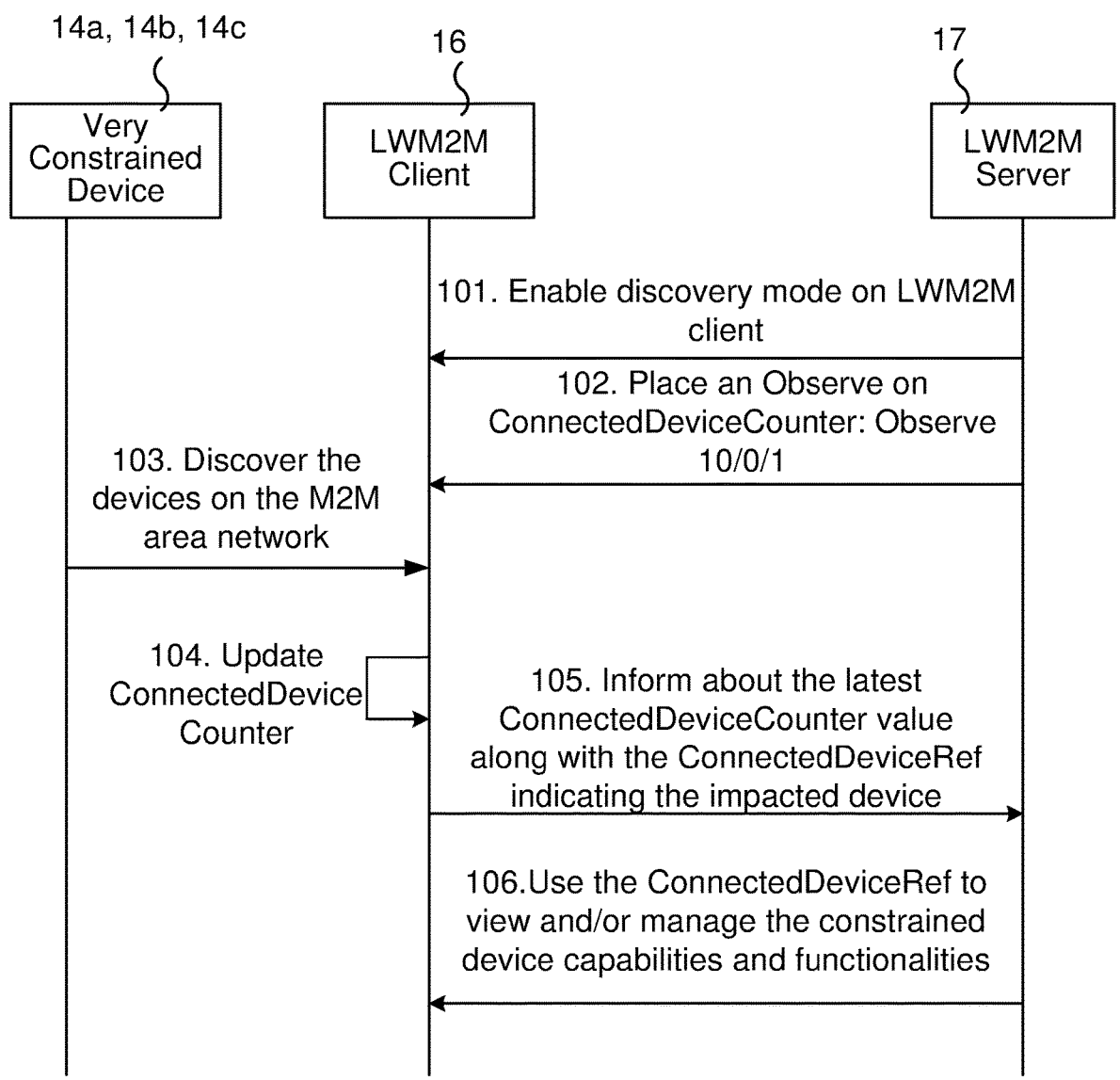
FIG. 6 is a sequence diagram illustrating control and management of the (very) constrained devices.

FIG. 6 is a sequence diagram illustrating control and management of the very constrained devices. In particular, a mechanism is illustrated for control and management of the very constrained devices 14*a*, 14*b*, 14*c* behind the LWM2M client 16 based on the LWM2M objects introduced herein. A near real time mechanism is provided for informing a LWM2M server 17 about attachment/detachment of the very constrained devices 14*a*, 14*b*, 14*c*.

As IoT devices can be "sleepy", i.e. in a state of hibernation, requests and responses may be cached etc., but these procedures are known, and sleepy devices have been addressed in IETF standards work and solutions are available or underway. The present teachings are transparent to this and may rely on and be compatible with how "sleepy devices" are supported. Bootstrapping and Registration are pre-requisites for these steps and, as they are known as such, description thereof is omitted here. Instead, for such details reference is made to IETF standards defining e.g. bootstrapping for IoT devices.

In FIG. 6 thus:

At arrow 101, the LWM2M server 17 enables the discovery mechanism by setting the EnableDiscovery resource to true. The LWM2M server 17 may enable this by a command "Write 10/0/0 true", wherein "10" represents the object identification (object ID) provided in the ConnectedDeviceController object (reference is made to Table 1), the first "0" represents the Object Instance i.e. first and only object instance of ConnectedDeviceController object, and the second "0" represents the resource identifier EnableDiscovery (reference is again made to Table 1). Hence, "10/0/0" refers to the exact resource of an object, and the value to be written on the resource is "true". The feature "discovery mode" on LWM2M client is thereby enabled and the LWM2M client can enable the UDP Port to accept attachment/detachment information from the devices 14*a*, 14*b*, 14*c* in the M2M Area Network.

At arrow 102, the LWM2M server 17 places an observe on the ConnectedDeviceCounter resource 24, which is a mechanism in LWM2M to subscribe to any changes on the observed resource. In this particular example, any changes to 10/0/1 are observed by the LWM2M server 17 and the LWM2M client 16 shall report any changes to the LWM2M server 17 as and when the changes occur. The ConnectedDeviceCounter resource 24 is incremented by one when a new device 14*a*, 14*b*, 14*c* is detected in the network and decremented by one when a device 14*a*, 14*b*, 14*c* is lost from the network.

At arrow 103, since the discovery mode is enabled in the LWM2M client 16, so the LWM2M client 16 may open up the UDP port (as a UDP Peer) through which a constrained device in the M2M Area Network may communicate to inform its attachment to the LWM2M client 16. The very constrained devices 14*a*, 14*b*, 14*c* are pre-provisioned with an IP address and UDP port of the LWM2M client 16, so the LWM2M client 16 opens this UDP port for communication. When the very constrained device 14*a*, 14*b*, 14*c* attaches to the M2M Area Network, it sends (arrow 103) an UDP message to the UDP port of the LWM2M client 16. The LWM2M client 16 may then, based on this attachment, create a ConnectedDevice object 23 providing a representation for the device 14*a*, 14*b*, 14*c* in the form of an object that is exposed to the LWM2M server 17. The device 14*a*, 14*b*, 14*c* capabilities may be provided to the LWM2M client 16 in the discovery process using either a proprietary protocol or other means such as for instance via a management interface through which a user may aid in the discovery.

At arrow 104, the LWM2M client 16 increments the value of ConnectedDeviceCounter resource 24 by one when a new device 14*a*, 14*b*, 14*c* is detected. Also, it creates a new ConnectedDevice object 23 capturing the functionality and capabilities of the added device 14*a*, 14*b*, 14*c*. Also, the ConnectedDeviceRef resource 25 stores the URI of the newly created ConnectedDevice object 23 as its value. The ConnectedDeviceCounter resource 24 gets updated as new devices are attached/detached with the LWM2M client 16.

At arrow 105, the LWM2M client 16 uses Notify to inform the LWM2M server 17 of changes in value for ConnectedDeviceCounter resource 24. The Notify also carries the operation i.e. device added/deleted along with the effected ConnectedDeviceRef resource 25. That is, as the value of ConnectedDeviceCounter resource 24 gets updated, the LWM2M client 16 informs LWM2M server 17 with the latest value along with the ConnectedDeviceRef resource 25 indicating the impacted device.

At arrow 106, the LWM2M server 17 may then use the ConnectedDeviceRef resource to view and/or manage the capabilities of the device 14*a*, 14*b*, 14*c* and functionality. To view and/or manage the device 14*a*, 14*b*, 14*c* capabilities the LWM2M server 17 can perform Read/Write/Execute operations on the ConnectedDevice object. This object is maintained at the LWM2M client 16 until the connected device 14*a*, 14*b*, 14*c* is attached to the M2M area network. It is noted that the object may, but need not be kept, but the reference to that object will not be used nor be valid.

It is noted that although illustrated in a particular sequential order, the communication (instructions, commands, information etc.) between the LWM2M server 17 and the LWM2M client 16 may be performed in other sequential orders as well. For instance, arrows 102 and 103 may be performed in the opposite order, i.e. the LWM2M client 16 discovering the devices and the LWM2M server 17 subsequently placing the ConnectedDeviceCounter 24.

Figure 7:
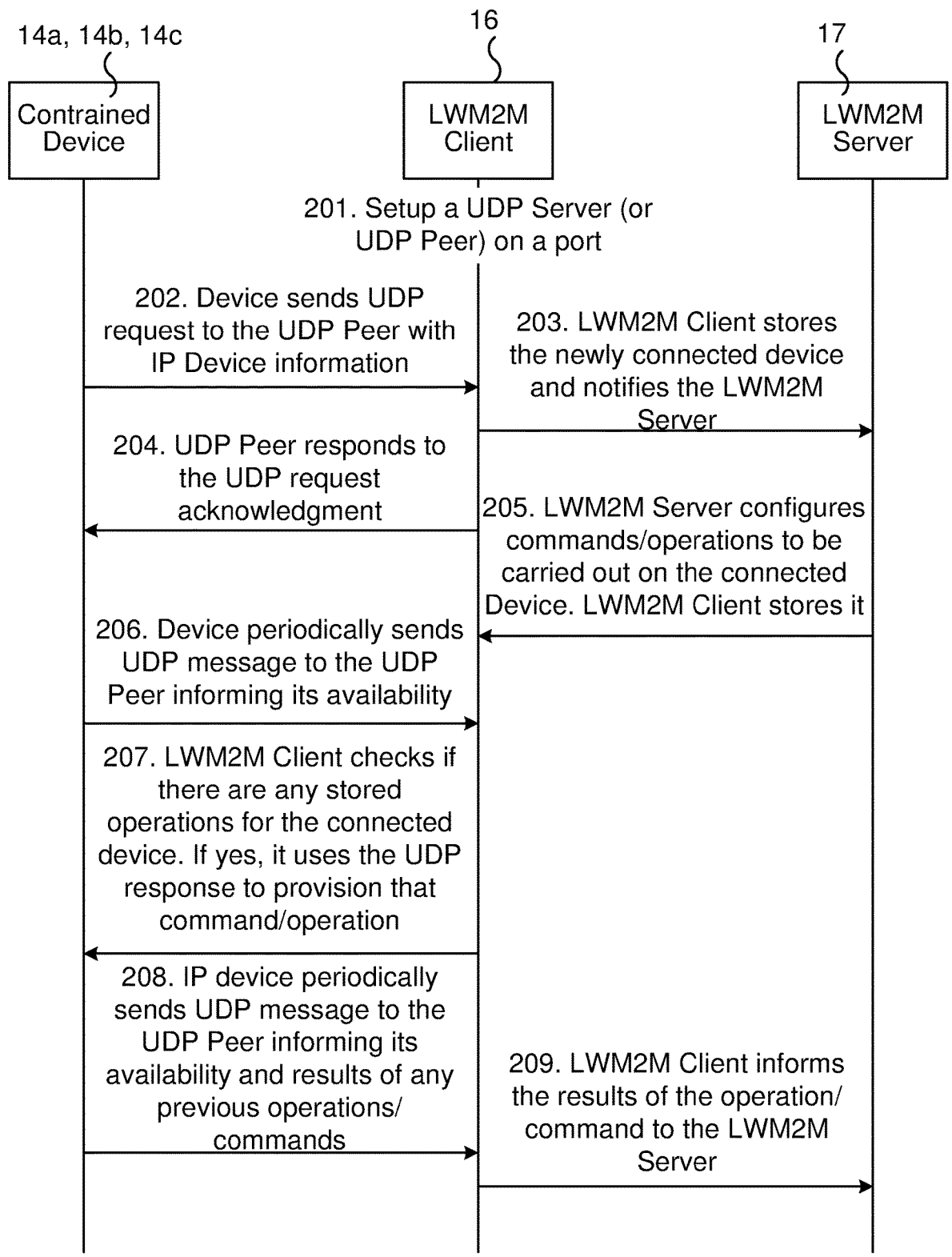
FIG. 7 is a sequence diagram illustrating discovery of constrained devices and further operations.

FIG. 7 is a sequence diagram illustrating discovery of constrained devices and further operations. In FIG. 7, procedures are illustrated for discovering IP devices that can be connected to the LWM2M client 16 and operations that may be performed on the (IP) constrained device, as described more in detail in the following.

At box 201, an UDP server or UDP peer is setup on a port. The LWM2M client 16 requires, when running on IP transport, an UDP (User Datagram Protocol) layer. This capability can be utilized to discover the very constrained devices 14*a*, 14*b*, 14*c*, which (as have been explained) are non-LWM2M IP devices (e.g. owing to limited processing resources). This feature may be enabled by enabling the EnableDiscovery resource, and when indeed enabled the LWM2M client 16 may setup a UDP server (or UDP Peer) on an UDP port (port number and IP address). This was also described with reference to arrow 101 of FIG. 6.

At arrow 202, if a very constrained devices 14*a*, 14*b*, 14*c* is within the network it will send an UDP message to the known IP address and port of the LWM2M client's 16 UDP port, as described with reference to FIG. 6. This UDP Peer information can be provisioned in the constrained device 14*a*, 14*b*, 14*c*, e.g. using provisioning/bootstrapping mechanisms and is known as such. Alternatively, a UDP broadcast or multicast mechanism can be used to discover the very constrained devices 14*a*, 14*b*, 14*c*. The LWM2M client 16 may thus send UDP broadcast in the M2M Area Network to inform the very constrained devices 141, 14b, 14c that it supports the feature of having them managed through the LWM2M server 17.

The UDP message from the constrained device 14a, 14b, 14c to the LWM2M client's 16 UDP Peer will carry a small constrained device representation as payload. This could be a simple JavaScript Object Notation (JSON) format payload like a smart IPSO object.

At arrow 203, the UDP Peer of the LWM2M client 16 will pass on the payload and constrained device information to the LWM2M client 16. The LWM2M client 16 may store the payload as ConnectedDevice Object, refer the object through the ConnectedDeviceRef and increase the ConnectedDeviceCounter by one. This update may then trigger a notification towards the LWM2M server 17.

At arrow 204, the UDP Peer will acknowledge the UDP message received from the very constrained devices 14a, 14b, 14c and may optionally configure the very constrained devices 14a, 14b, 14c for further heartbeat configuration. Such heartbeat ensures that the very constrained devices 14a, 14b, 14c will periodically send an UDP message to the UDP Peer (set up by the client 16) to confirm its availability. The LWM2M client 16 may hence get periodical updates from the very constrained devices 14a, 14b, 14c, after having received a request from them (see arrow 202, and related description).

At arrow 205, the LWM2M server 17 may now send any command or operation to the ConnectedDevice Object 23, and such command or operation results in an update of the ConnectedDevice Object 23. The ConnectedDevice Object 23 stores the latest configuration that the LWM2M server 17 wants to see relating to the very constrained device 14a, 14b, 14c.

At arrow 206, as per the periodic UDP message heartbeat, the very constrained device 14a, 14b, 14c sends a UDP message to the UDP Peer. It is noted that this UDP message is sent only if periodical updating has been requested by the LWM2M client 16 (see arrow 204).

At arrow 207, if a configuration request according to arrow 204 has been received, then the LWM2M client 16 checks if there are any updates to the ConnectedDevice Object 23 corresponding to the very constrained device 14a, 14b, 14c. If yes, the LWM2M client 16 uses an UDP response message to send the updated command or operation to the very constrained device 14a, 14b, 14c. This may, as before, be in the form of a lightweight payload such as e.g. JSON.

At arrow 208, the very constrained devices 14a, 14b, 14c sends the response of the previous operations or commands in a subsequent UDP message.

At arrow 209, the LWM2M client 16 may inform the results of the operations or commands previously provisioned.

A mechanism is thus suggested on how to discover and manage constrained devices that support IP communication based on UDP protocol. UDP is used here as an example, as UDP would keep the exchange lightweight and considering the support of UDP in the LWM2M client stack. It is however noted that other protocols could be used. It may be beneficial (if possible) for the constrained (IP) devices to support application layer protocols such as CoAP that are optimized for machine to machine communication for constrained devices. Alternatively, the UDP raw packets may be used (as suggested above) using JSON based payload that can be understood by the LWM2M client and server protocols.

The above mechanism can be supported for a set of constrained IP-enabled constrained devices behind a LWM2M client 16.

In the following some aspects relating to impact on Register operation and addressing is provided.

The "Register" operation includes the Endpoint Client Name parameter along with other parameters. The "Register" operation must include a value for the Endpoint Client Name parameter that is unique on that LWM2M Server 17.

Upon receiving a "Register" operation from the LWM2M client 16, the LWM2M server 17 records the IP address and port from the IP packet of the registration message and uses this information for all future interactions with that LWM2M client 16.

For the purpose of the present teachings, there are at least two approaches that the LWM2M client 16 may use to handle registration:

1. The LWM2M client 16 may use separate Client Registration Interface for each constrained device 14a, 14b, 14c. In this case, whenever a new constrained device attaches to the LWM2M client 16 (e.g. according to arrow 103 of FIG. 6 or arrow 202 of FIG. 7 and related description), the LWM2M client 16 will use a different port than the one it used for its initial registration (when the LWM2M client registered initially with the LWM2M server 17). This will ensure that the LWM2M server 17 will consider it a new and different registration request and not a re-register for the same LWM2M client 16. However, for this to work, the LWM2M client 16 should be able to assign (or learn) a unique identifier to the constrained device and carry that information as part of Endpoint Client Name in the Register operation payload. The payload will also capture the ConnectedDevice object 23 and its relevant instances. Similar procedures apply when there is change (Update operation) at the constrained device 14a, 14b, 14c or the constrained device 14a, 14b, 14c detaches (De-register operation).

This approach is beneficial as it clearly keeps the LWM2M Interfaces (and possibly most of the contexts) separate for each constrained device 14a, 14b, 14c with only a single LWM2M client 16 supporting it all.

2. The LWM2M client 16 may use single Client Registration Interface for all the constrained devices 14a, 14b, 14c. In this case, whenever a new constrained device attaches to the LWM2M client 16, the LWM2M client 16 does not send separate Register requests and may instead Notify (as has been explained in detail earlier, e.g. at arrow 105 of FIG. 6) the LWM2M server 17. The Client Registration Interface (including Register/Update/De-Register operations) remains intact and the attachment/detachment of the constrained devices 14a, 14b, 14c is handled through the Device Management and Service Enablement interface as described earlier (e.g. Observe/Notify).

This approach is beneficial if the LWM2M client 16 is unable to assign or learn unique end point client names for each constrained device 14a, 14b, 14c. Also, this is beneficial if the LWM2M client 16 does not want to open separate UDP client ports for each constrained device 14a, 14b, 14c towards the LWM2M server 17.

The various features and embodiments that have been described may be combined in a number of different ways, examples of which are given in the following, with reference first to FIG. 8.

Figure 8:
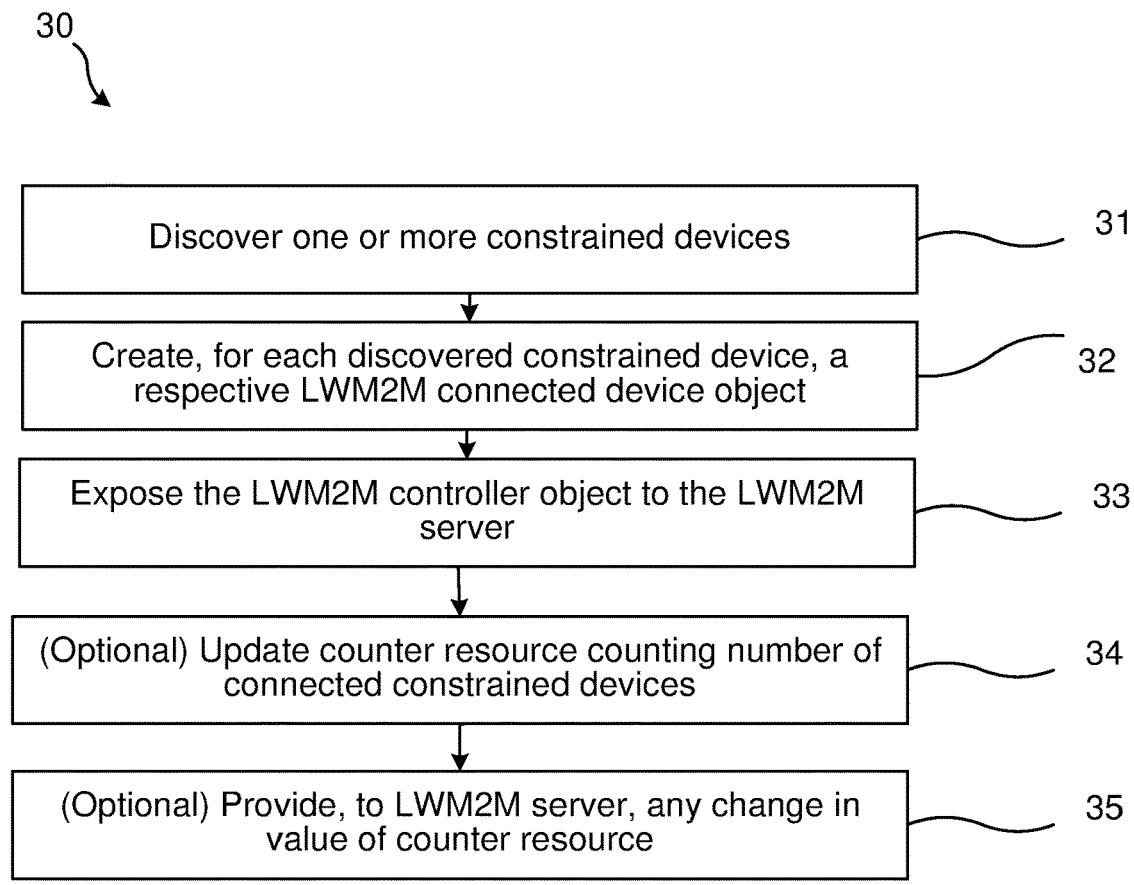
FIG. 8 illustrates a flow chart over steps of a method in a client device in accordance with the present teachings.

FIG. 8 illustrates a flow chart over steps of a method in a client device 16 in accordance with the present teachings. The method 30 may be performed in a client device 16 for managing constrained devices 14a, 14b, 14c, which to at least some extent, fail to support a Lightweight Machine to Machine, LWM2M, protocol. The client device 16 is compatible with a LWM2M protocol for communicating with a LWM2M server 17 and comprises a LWM2M controller object 22 for management of any discovered constrained device 14a, 14b, 14c. The method 30 comprises discovering 31 one or more constrained devices 14a, 14b, 14c. The client device 16 may try to find such devices based on any supported access technology, e.g. Wi-Fi.

The method 30 comprises creating 32, for each discovered constrained device 14a, 14b, 14c, a respective LWM2M connected device object 23, wherein the LWM2M controller object 22 points at the one or more created LWM2M connected device objects 23.

The method 30 comprises exposing 33 the LWM2M controller object 22 to the LWM2M server 17.

The method 30 enables the client device 16 to support a number of constrained devices, e.g. IoT devices hosting an IP stack. The method 30 enables the client device 16 to handle network communication with a LWM2M server on behalf of the constrained devices, e.g. communication for operations that need to be executed on the constrained devices. The constrained devices can thus be kept as low-complexity devices, alleviated with the need to host a LWM2M protocol stack.

As should be evident from the description, the terms "very constrained device" or "constrained device" as used herein represent constrained devices so limited in terms of processing power and storage capabilities that they are unable to support a full-fledged standardized application protocol support like CoAP and LWM2M but support UDP/IP (minimal/light support) transport with raw/small UDP messages understood by either ends for communication conveying limited and relevant information. Most such very constrained devices lack a LWM2M protocol stack, while some might have adapted versions thereof.

The LWM2M client 16 may comprise various resources, each of these resources enabling in a respective aspect the management of the very constrained device 14a, 14b, 14c.

In an embodiment, the method 30 comprises:
updating 34 a counter resource 24 of the LWM2M controller object 22, the counter resource 24 counting number of connected constrained device 14a, 14b, 14c, and
providing 35 to the LWM2M server 17 any change in value of the counter resource 24.

In various embodiments, the discovering 31 is preceded by receiving, from the LWM2M server 17, an indication to set a discovery mode.

In a variation of the above embodiment, the method 30 comprises enabling, in response to receiving the indication, a User Datagram Protocol, UDP, port to accept attachment and detachment information from constrained devices 14a, 14b, 14c.

In various embodiments, the LWM2M controller object 22 comprises resources related to the managing of the constrained device 14a, 14b, 14c, the resources comprising one or more of: resource for enabling discovery 26, counter resource 24 for counting number of connected constrained devices 14a, 14b, 14c reachable by the client device 16 and reference resource 25 for maintaining a list of references to the created LWM2M connected device objects 23.

In various embodiments, the discovering 31 is made over a User Datagram Protocol/Internet Protocol, UDP/IP based communication link between the client device 16 and the constrained devices 14a, 14b, 14c.

In various embodiments, each of the created one or more LWM2M connected device objects 23 comprises capabilities and/or functionality of the respective discovered constrained device 14a, 14b, 14c.

In various embodiments, the LWM2M object 23 comprises a reference resource 25 for maintaining a list of references to the created LWM2M connected device objects 23, each reference comprising a Uniform Resource Identifier for identifying the respective created LWM2M connected device object 23 for the discovered constrained devices 14a, 14b, 14c.

In various embodiments, the method 30 comprises receiving from the constrained device 14a, 14b, 14c an UDP message, the UDP message carrying a constrained device representation as payload.

Figure 9:
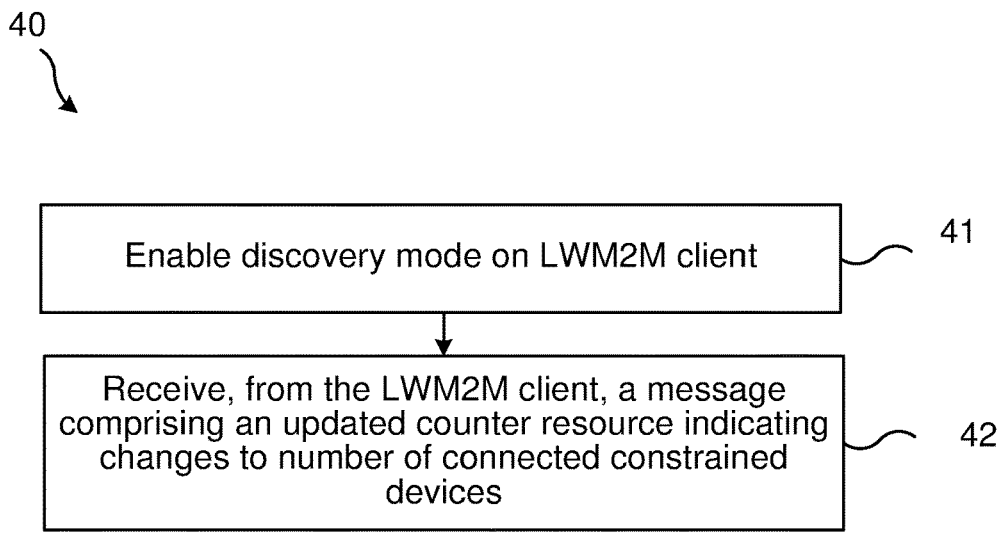
FIG. 9 illustrates a flow chart over steps of a method in a server device in accordance with the present teachings.

FIG. 9 illustrates a flow chart over steps of a method in a server device in accordance with the present teachings. A method 40 is provided, which may be performed in a server device 17 for managing constrained devices 14a, 14b, 14c, which to at least some extent fail to support a Lightweight Machine to Machine, LWM2M, protocol. The server device 17 is compatible with a LWM2M protocol for communicating with a client device 16. The method 40 comprises enabling 41 a discovery mode on the LWM2M client 16.

The method 40 comprises receiving 42, from the LWM2M client device 16, a message comprising an updated counter resource 24 indicating any changes to the number of connected constrained devices 14a, 14b, 14c and an updated reference resource 25 maintaining a list of references to created LWM2M connected device objects 23 for all connected constrained devices 14a, 14b, 14c.

The method 40 provides several advantages. For instance, the server device 17 needs only communicate with a single LWM2M client device rather than a number of constrained devices. The server device may thus run fewer separate LWM2M instances.

In an embodiment, the method 40 comprises sending, to the LWM2M client device 16 a command to be carried out on one or more of the connected constrained device 14a, 14b, 14c.

In various embodiments, each reference comprises a Uniform Resource Identifier for identifying the respective created LWM2M connected device object 23.

Figure 10:
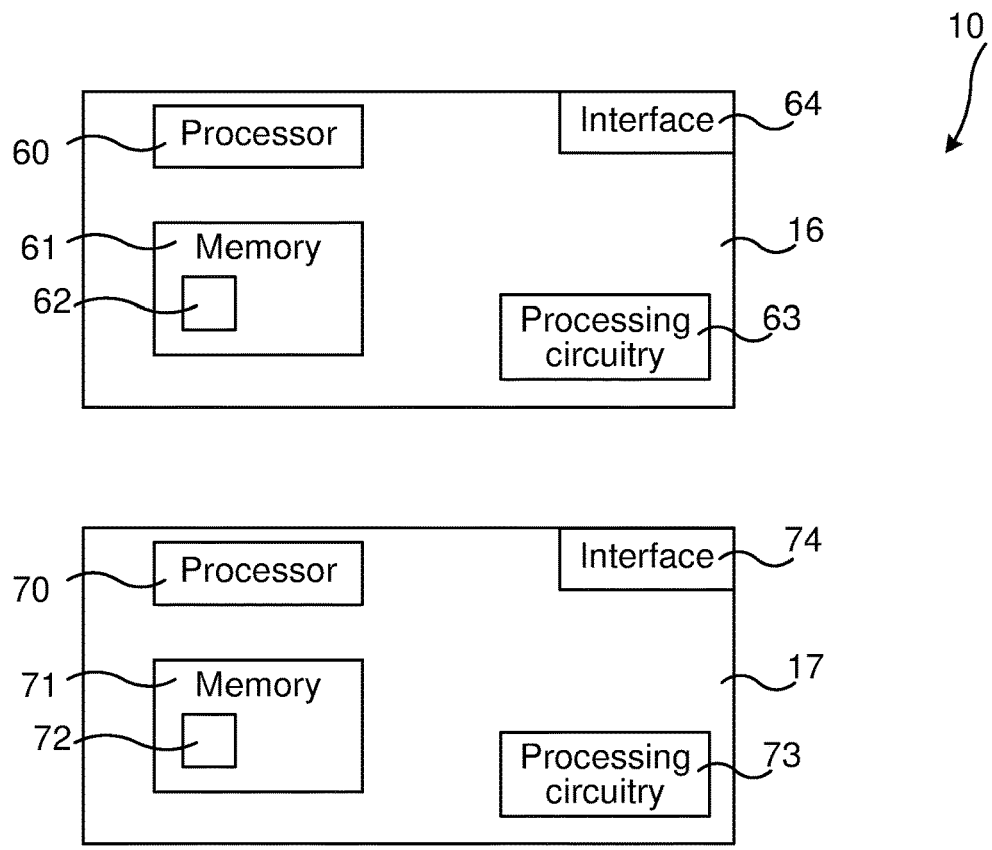
FIG. 10 illustrates schematically a system and means for implementing embodiments in accordance with the present teachings.

FIG. 10 illustrates schematically a system and means for implementing embodiments in accordance with the present teachings. In FIG. 10, the system 10 is shown comprising a client device 16 and server device 17, in which methods according to the present teachings may be implemented. The client device 16 and server device 17 each comprises a processor 60, 70 comprising any combination of one or more of a central processing unit (CPU), multiprocessor, microcontroller, digital signal processor (DSP), application specific integrated circuit etc. capable of executing software instructions stored in a memory 61, 71 which can thus be a computer program product 61, 71. The processor 60 of the client device 16 can be configured to execute any of the various embodiments of the method 30 for instance as described in relation to FIG. 8. The processor 70 of the server device 17 can be configured to execute any of the various embodiments of the method 40 for instance as described in relation to FIG. 9.

The memory 71, 81 can be any combination of read and write memory (RAM) and read only memory (ROM), Flash memory, magnetic tape, Compact Disc (CD)-ROM, digital versatile disc (DVD), Blu-ray disc etc. The memory 71, 81 may also comprise persistent storage, which, for example, can be any single one or combination of magnetic memory, optical memory, solid state memory or even remotely mounted memory.

Each of the client device 16 and the server device 17 comprises an interface 64, 74 for communication with other devices. The interface 64 of the client device 16 may, for instance, comprise an interface e.g. protocol stacks etc., for communication with the constrained devices, and also an interface for communication with the server device 17.

The interface 74 of the server device 17 may, for instance, an interface, e.g. protocol stacks etc., for communication with the client device 16.

Each of the client device 16 and the server device 17 may comprise additional processing circuitry, schematically indicated at reference numerals 63, 73, respectively, for implementing the various embodiments according to the present teachings.

A client device 16 is provided for managing constrained devices 14a, 14b, 14c, which to at least some extent fail to support a Lightweight Machine to Machine, LWM2M, protocol. The client device 16 is compatible with a LWM2M protocol for communicating with a LWM2M server 17 and comprises a LWM2M controller object 22 for management of any discovered constrained device 14a, 14b, 14c. The client device 16 is configured to:

discover one or more constrained devices 14a, 14b, 14c, create, for each discovered constrained device 14a, 14b, 14c, a respective LWM2M connected device object 23, wherein the LWM2M controller object 22 points at the one or more created LWM2M connected device objects 23, and expose the LWM2M controller object 22 to the LWM2M server 17.

The client device 16 may be configured to perform the above steps e.g. by comprising one or more processors 60 and memory 61, the memory 61 containing instructions executable by the processor 60, whereby the client device 16 is operative to perform the steps.

In an embodiment, the client device 16 is configured to:

update a counter resource 24 of the LWM2M controller object 22, the counter resource 24 counting number of connected constrained device 14a, 14b, 14c, and provide to the LWM2M server 17 any change in value of the counter resource 24.

In an embodiment, the client device 16 is configured to discover upon receiving, from the LWM2M server 17, an indication to set a discovery mode.

In an embodiment, the client device 16 is configured to enable, in response to receiving the indication, an User Datagram Protocol, UDP, port to accept attachment and detachment information from constrained devices 14a, 14b, 14c.

In various embodiments, the LWM2M controller object 22 comprises resources related to the managing of the constrained device 14a, 14b, 14c, the resources comprising one or more of: resource for enabling discovery 26, counter resource 24 for counting number of connected constrained devices 14a, 14b, 14c reachable by the client device 16 and reference resource 25 for maintaining a list of references to the created LWM2M connected device objects 23.

In an embodiment, the client device 16 is configured to discover over a User Datagram Protocol/Internet Protocol, UDP/IP based communication link between the client device 16 and the constrained devices 14a, 14b, 14c.

In various embodiments, each of the created one or more LWM2M connected device objects 23 comprises capabilities and/or functionality of the respective discovered constrained device 14a, 14b, 14c.

In various embodiments, the LWM2M object 23 comprises a reference resource 25 for maintaining a list of references to the created LWM2M connected device objects 23, each reference comprising a Uniform Resource Identifier for identifying the respective created LWM2M connected device object 23 for the discovered constrained devices 14a, 14b, 14c.

In an embodiment, the client device 16 is configured to receive from the constrained device 14a, 14b, 14c an UDP message, the UDP message carrying a constrained device representation as payload.

The present teachings also encompass a computer program 62 for a client device 16 for managing constrained devices. The computer program 62 comprises computer program code, which, when executed on at least one processor on the client device 16 causes the client device 16 to perform the method 30 according to any of the described embodiments.

The present disclosure also encompasses computer program products 61 comprising a computer program 62 for implementing the embodiments of the method as described, and a computer readable means on which the computer program 62 is stored. The computer program product, or the memory, thus comprises instructions executable by the processor 60. Such instructions may be comprised in a computer program, or in one or more software modules or function modules. The computer program product 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

A server device 17 is provided for managing constrained devices 14a, 14b, 14c, which to at least some extent fail to support a Lightweight Machine to Machine, LWM2M, protocol. The server device 17 is compatible with a LWM2M protocol for communicating with a client device 16. The server device 17 is configured to:

enable a discovery mode on the LWM2M client 16, and receive, from the LWM2M client device 16, a message comprising an updated counter resource 24 indicating any changes to the number of connected constrained devices 14a, 14b, 14c and an updated reference resource 25 maintaining a list of references to created LWM2M connected device objects 23 for all connected constrained devices 14a, 14b, 14c.

The server device 17 may be configured to perform the above steps e.g. by comprising one or more processors 70 and memory 71, the memory 71 containing instructions executable by the processor 70, whereby the server device 17 is operative to perform the steps.

In an embodiment, the server device 17 is configured to send, to the LWM2M client device 16 a command to be carried out on one or more of the connected constrained device 14a, 14b, 14c.

In various embodiments, each reference comprises a Uniform Resource Identifier for identifying the respective created LWM2M connected device object 23.

The present teachings also encompass a computer program 72 for a server device 17 for managing constrained devices. The computer program 72 comprises computer program code, which, when executed on at least one processor on the server device 17 causes the server device 17 to perform the method 40 according to any of the described embodiments.

The present disclosure also encompasses computer program products 71 comprising a computer program 72 for implementing the embodiments of the method as described, and a computer readable means on which the computer program 72 is stored. The computer program product, or the memory, thus comprises instructions executable by the processor 70. Such instructions may be comprised in a computer program, or in one or more software modules or function modules. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 11:
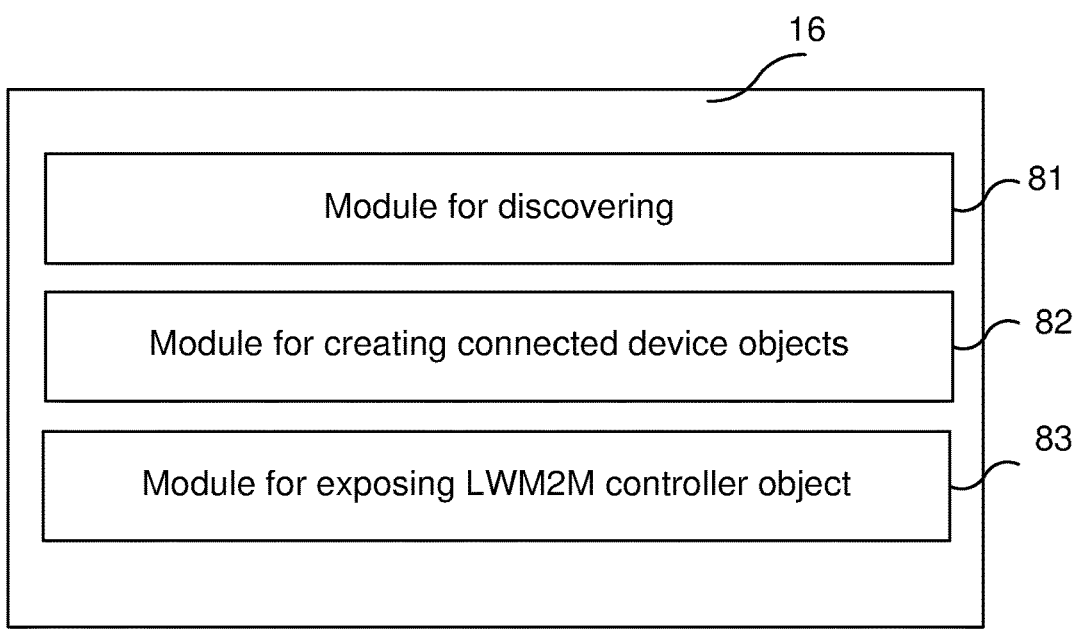
FIG. 11 illustrates a client device comprising function modules/software modules for implementing embodiments in accordance with the present teachings.

FIG. 11 illustrates a client device comprising function modules/software modules for implementing embodiments in accordance with the present teachings. The modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described.

A method client device 16 is provided for managing constrained devices, which to at least some extent fail to support a Lightweight Machine to Machine, LWM2M, protocol. The client device 16 is compatible with a LWM2M protocol for communicating with a LWM2M server 17 and comprises a LWM2M controller object 22 for management of any discovered constrained device. The client device 16 comprises a first module 81 for discovering one or more constrained devices. Such first module 81 may for instance comprise processing circuitry adapted to discover a constrained device, e.g. by detecting reception of a message carrying a representation of a constrained device as payload.

The client device 16 comprises a second module 82 for creating, for each discovered constrained device, a respective LWM2M connected device object, wherein the LWM2M controller object points at the one or more created LWM2M connected device objects. Such second module 82 may comprise processing circuitry adapted to creating objects, for instance objects such as a data structure, e.g. an array or associative array.

The client device 16 comprises a third object 83 for exposing the LWM2M controller object to the LWM2M server. Such third module 83 may for instance comprise processing circuitry making the LWM2M controller object accessible for the LWM2M server.

It is noted that one or more of the modules 81, 82, 83 may be replaced by units.

Figure 12:
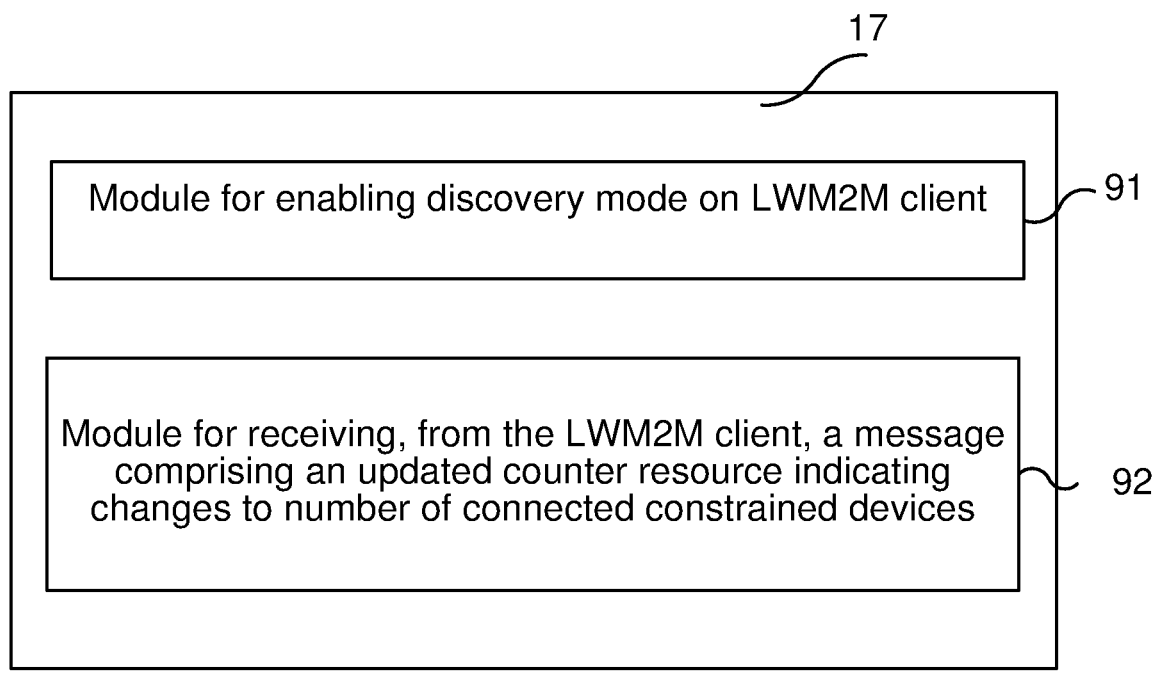
FIG. 12 illustrates a server device comprising function modules/software modules for implementing embodiments in accordance with the present teachings.

FIG. 12 illustrates a server device comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described.

A server device 17 is provided for managing constrained devices, which to at least some extent fail to support a Lightweight Machine to Machine, LWM2M, protocol. The server device 17 is compatible with a LWM2M protocol for communicating with a client device. The server device comprises a first module 91 for enabling a discovery mode on the LWM2M client. Such first module 91 may for instance comprise processing circuitry adapted to enable the discovery mode by being adapted to send a command to the LWM2M device via an output device (e.g. interface 74 described with reference to FIG. 10).

The server device 17 comprises a second module 92 for receiving, from the LWM2M client device, a message comprising an updated counter resource indicating any changes to the number of connected constrained devices and an updated reference resource maintaining a list of references to created LWM2M connected device objects for all connected constrained devices. Such second module 92 may for instance comprise receiving circuitry.

It is noted that one or both of the modules 91, 92 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a client device for managing constrained devices, the client device being compatible with a Lightweight Machine to Machine, LWM2M, protocol for communicating with a LWM2M server and comprising a LWM2M controller object for management of any discovered constrained device, the method comprising:
    discovering one or more constrained devices;
    creating, for each discovered constrained device, a respective LWM2M connected device object;
    for each respective LWM2M connected device object, including in the LWM2M controller object a reference to the respective LWMWM connected device object; and
    exposing the LWM2M controller object to the LWM2M server.

2. The method of claim 1, further comprising
    updating a counter resource of the LWM2M controller object, the counter resource counting number of connected constrained device; and
    providing to the LWM2M server any change in value of the counter resource.

3. The method of claim 1, wherein the discovering is preceded by receiving, from the LWM2M server, an indication to set a discovery mode.

4. The method of claim 3, comprising enabling, in response to receiving the indication, a User Datagram Protocol, UDP, port to accept attachment and detachment information from constrained devices.

5. The method of claim 1, wherein the LWM2M controller object comprises resources related to the managing of the constrained device, the resources comprising one or more of: resource for enabling discovery or counter resource for counting number of connected constrained devices reachable by the client device.

6. The method of claim 1, wherein the discovering is made over a User Datagram Protocol/Internet Protocol (UDP/IP) based communication link between the client device and the constrained devices.

7. The method of claim 1, wherein each of the created one or more LWM2M connected device objects comprises capabilities and/or functionality of the respective discovered constrained device.

8. The method of claim 1, wherein the LWM2M object comprises a reference resource for maintaining a list of references to the created LWM2M connected device objects, each reference comprising a Uniform Resource Identifier for identifying the respective created LWM2M connected device object for the discovered constrained devices.

9. The method of claim 1, comprising receiving from the constrained device a User Datagram Protocol (UDP) protocol data unit (PDU) carrying a constrained device representation as payload.

10. A computer program product comprising a non-transitory computer readable medium storing a computer program for a client device for managing constrained devices, the computer program comprising computer program code, which, when executed on at least one processor on the client device causes the client device to perform the method of claim 1.

11. The method of claim 1, further comprising:
after creating a connected device object for a particular discovered constrained device, the client device adding to the LWM2M controller object a pointer to the connected device object for a particular discovered constrained device; and
the client sending to the LWM2M server a notification message comprising the pointer to the connected device object.

12. The method of claim 11, further comprising: after sending the notification message to the LWM2M server, the client device receiving a message transmitted by the server for managing the particular discovered constrained device, wherein the message comprises the pointer to the connected device object for the particular discovered constrained device.

13. The method of claim 1, wherein the step of discovering the one or more constrained devices comprises: obtaining a pre-defined port value identifying a transport layer port; and listening for messages addressed to the identified transport layer port.

14. A client device for managing constrained devices, the client device being compatible with a Lightweight Machine to Machine (LWM2M) protocol for communicating with a LWM2M server and comprising a LWM2M controller object for management of any discovered constrained device, the client device being configured to:
discover one or more constrained devices;
create, for each discovered constrained device, a respective LWM2M connected device object;
for each respective LWM2M connected device object, include in the LWM2M controller object a reference to the respective LWMWM connected device object and expose the LWM2M controller object to the LWM2M server.

15. The client device of claim 14, further configured to:
update a counter resource of the LWM2M controller object, the counter resource counting number of connected constrained device, and
provide to the LWM2M server any change in value of the counter resource.

16. The client device of claim 14, further configured to discover upon receiving, from the LWM2M server, an indication to set a discovery mode.

17. The client device of claim 16, further configured to enable, in response to receiving the indication, an User Datagram Protocol, UDP, port to accept attachment and detachment information from constrained devices.

18. The client device of claim 14, wherein the LWM2M controller object comprises resources related to the managing of the constrained device, the resources comprising one or more of: resource for enabling discovery, or counter resource for counting number of connected constrained devices reachable by the client device.

19. The client device of claim 14, configured to discover over a User Datagram Protocol/Internet Protocol, UDP/IP based communication link between the client device and the constrained devices.

20. The client device of claim 14, wherein each of the created one or more LWM2M connected device objects comprises capabilities and/or functionality of the respective discovered constrained device.

21. The client device of claim 14, wherein the LWM2M object comprises a reference resource for maintaining a list of references to the created LWM2M connected device objects, each reference comprising a Uniform Resource Identifier for identifying the respective created LWM2M connected device object for the discovered constrained devices.

22. The client device of claim 14, configured to receive from the constrained device an UDP message, the UDP message carrying a constrained device representation as payload.

* * * * *